(12) United States Patent
Yang

(10) Patent No.: US 11,641,949 B1
(45) Date of Patent: May 9, 2023

(54) HIDDEN CUSHION POCKET

(71) Applicant: James Yang, Chino Hills, CA (US)

(72) Inventor: James Yang, Chino Hills, CA (US)

(*) Notice: Subject to any disclaimer, the term of this patent is extended or adjusted under 35 U.S.C. 154(b) by 0 days.

(21) Appl. No.: 17/572,724

(22) Filed: Jan. 11, 2022

(51) Int. Cl.
  *A47C 9/10* (2006.01)
  *A47C 31/00* (2006.01)
  *F16M 13/02* (2006.01)
  *A47C 7/02* (2006.01)

(52) U.S. Cl.
  CPC ............. *A47C 31/00* (2013.01); *A47C 7/021* (2013.01); *F16M 13/02* (2013.01)

(58) Field of Classification Search
  CPC combination set(s) only.
  See application file for complete search history.

(56) References Cited

U.S. PATENT DOCUMENTS

| | | | |
|---|---|---|---|
| 4,440,443 A | 4/1984 | Nordskog | |
| 4,635,306 A * | 1/1987 | Willey | A47C 16/005 D6/601 |
| 4,970,742 A * | 11/1990 | Keener | A47C 20/027 5/640 |
| 5,138,728 A * | 8/1992 | Aston | A47G 9/1045 5/645 |
| 5,425,567 A * | 6/1995 | Albecker, III | A47C 1/146 297/452.29 |
| 6,038,719 A * | 3/2000 | Castagna | A47G 9/1045 5/639 |
| 6,594,836 B1 | 7/2003 | Everson et al. | |
| 7,810,192 B2 * | 10/2010 | Fujita | A47G 9/109 5/636 |
| D632,901 S | 2/2011 | Christoffel | |
| 8,321,978 B1 * | 12/2012 | Fulton | A63H 3/003 5/639 |
| 8,578,528 B1 | 11/2013 | Heare | |
| 8,613,479 B2 | 12/2013 | Schurg et al. | |
| 9,895,001 B1 | 2/2018 | Goldszer | |
| 10,264,892 B1 | 4/2019 | Sosa | |
| 10,806,263 B1 | 10/2020 | Leverett | |
| 2004/0261668 A1 * | 12/2004 | Jarke | H01M 4/9066 108/43 |
| 2007/0213772 A1 * | 9/2007 | Cianfrani | A61H 19/34 607/2 |
| 2008/0216243 A1 * | 9/2008 | McQuoid | A47G 9/1045 5/639 |
| 2009/0032667 A1 * | 2/2009 | Sween | A47B 23/042 248/346.03 |
| 2012/0261539 A1 * | 10/2012 | Huang | A47C 7/425 248/346.03 |
| 2015/0351564 A1 * | 12/2015 | Vogel | A47G 9/1054 5/640 |
| 2019/0045932 A1 * | 2/2019 | Turner | A61H 19/44 |

* cited by examiner

*Primary Examiner* — Robert G Santos
*Assistant Examiner* — Ifeolu A Adeboyejo
(74) *Attorney, Agent, or Firm* — Cramer Patent & Design, PLLC; Aaron R. Cramer

(57) ABSTRACT

The couch pocket may comprise a cushion and a pocket. The pocket may be located within the cushion and may therefore be hidden from view when not in use. The pocket may be accessible at the top of the cushion and may be adapted to retain a portable electronic device. As non-limiting examples, the portable electronic device may be a smartphone, a tablet computer, a game controller, or a TV remote control. The pocket may be sized to permit the portable electronic device to stand upright such that the portable electronic device may remain visible while residing in the pocket.

9 Claims, 7 Drawing Sheets

HIDDEN CUSHION POCKET

RELATED APPLICATIONS

None.

FIELD OF THE INVENTION

The present invention relates generally to a couch and more specifically to a couch for children having a hidden pocket disposed within a top pillow.

BACKGROUND OF THE INVENTION

As anyone with children will attest, children are prone to losing things between the cushions of a couch or underneath the couch. Often times the lost article will be a television remote or electronic device. While adults also lose such articles in a couch the problem seems particularly common to children.

A common solution is to utilize a couch pocket which may removably hang over an arm of the couch. However, given that such pockets are not attached to the couch they are equally susceptible to being misplaced by a child. Therefore, a need exists for a pocket which is disposed within a cushion pillow in an unobtrusive manner which precludes the pocket being misplaced while also providing an easily accessible storage means for a television remote or electronic device. The development of the hidden cushion pocket fulfills this need in a manner which is both cost effective and efficient.

SUMMARY OF THE INVENTION

The principles of the present invention provide for a hidden cushion pocket that has, a cushion having a covering, a fill material, a top, a cushion top side, a cushion bottom side, a cushion left side, and a cushion right side; and a pocket disposed within the cushion. The pocket is accessible at the top of the cushion and is adapted to retain a portable electronic device.

The covering may be a flexible outer surface of the cushion. The covering may be a material selected from the group consisting of cotton, linen, wool, natural leather, faux leather, acetate, hemp, silk, polyester, polypropylene, acrylic, rayon, or any combinations thereof. The covering may include one or more seams. The covering may be removable for laundering. The covering may be a pocket aperture that may provide access to the pocket from outside of the cushion. The pocket aperture may be an aperture through the covering because of an opening cut in the covering or because of a gap in a seam. The seam may include one or more edges where different panels of the covering are coupled. The covering may include a zipper at the location of the pocket aperture that may be closed to cover the pocket and is opened to provide access to the pocket. The fill material may soften the cushion and/or shape the cushion.

The fill material may be upholstery foam. The fill material may be a plurality of loose fill. The loose fill may be selected from the group consisting of shredded foam, feathers, wool, polystyrene, horsehair, or shredded rubber. The cushion rear side may be vertically oriented, and the cushion front side may be inclined from vertical by a front slope angle such that the overall shape of the cushion is that of a right trapezoidal prism with the cushion top side that is narrower than the cushion bottom side. The cushion may be placed upon a sofa, a love seat, a floor, or a children's play area. The pocket may be sized to permit the portable electronic device to stand upright such that the portable electronic device remains visible while residing in the pocket. The fill material may be selected from the group consisting of cotton, linen, wool, natural leather, faux leather, acetate, hemp, silk, polyester, polypropylene, acrylic, rayon, or any combinations thereof. The portable electronic device may be selected from the group consisting of a smartphone, a tablet computer, a game controller, or a TV remote control. The pocket may be a pouch that is located inside of the cushion.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
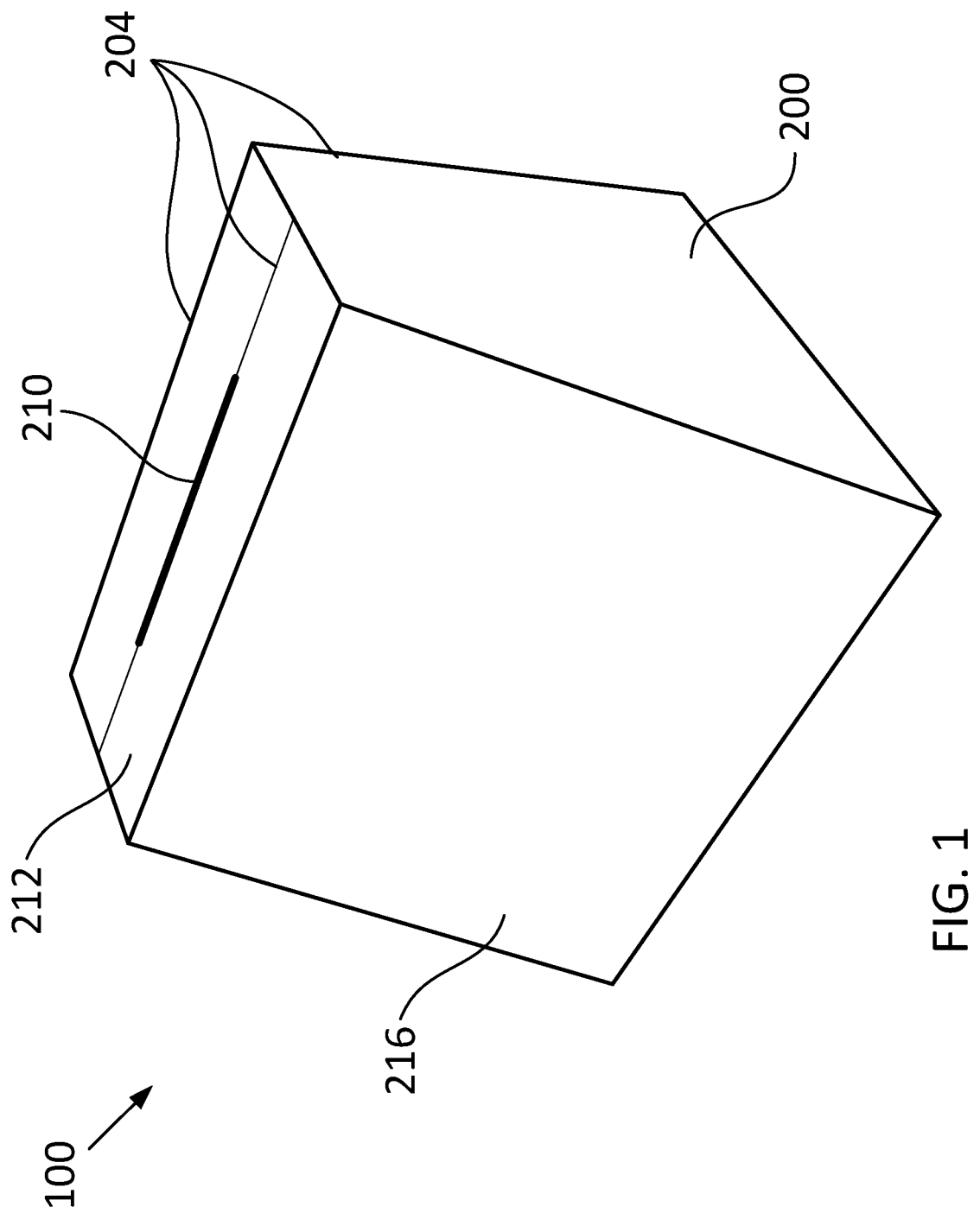
FIG. 1 is an isometric view of a hidden cushion pocket, according to an embodiment of the present invention.
Figure 2:
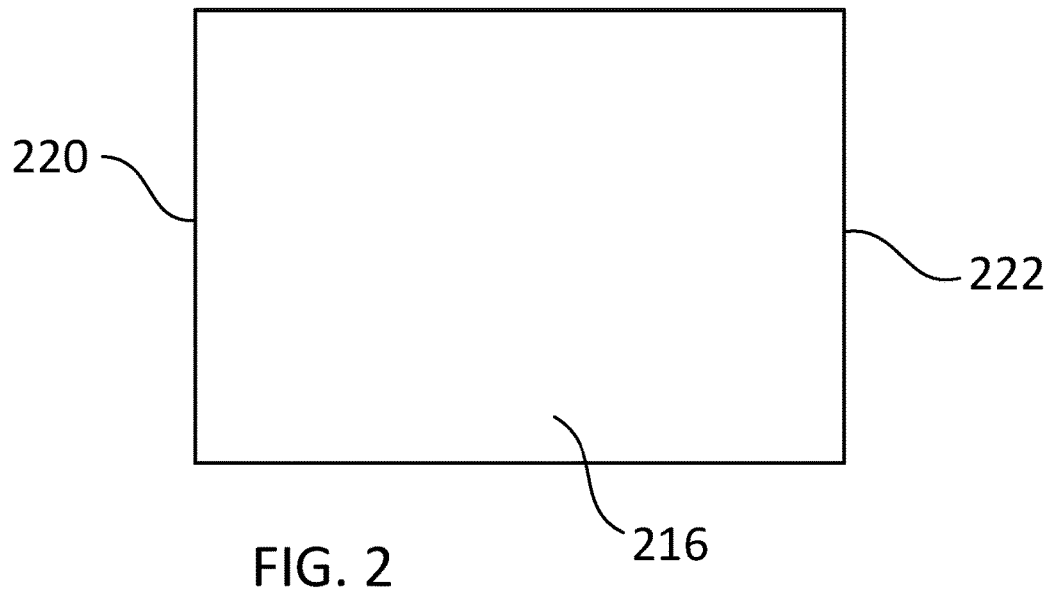
FIG. 2 is a front view of a hidden cushion pocket, according to an embodiment of the present invention.
Figure 3:
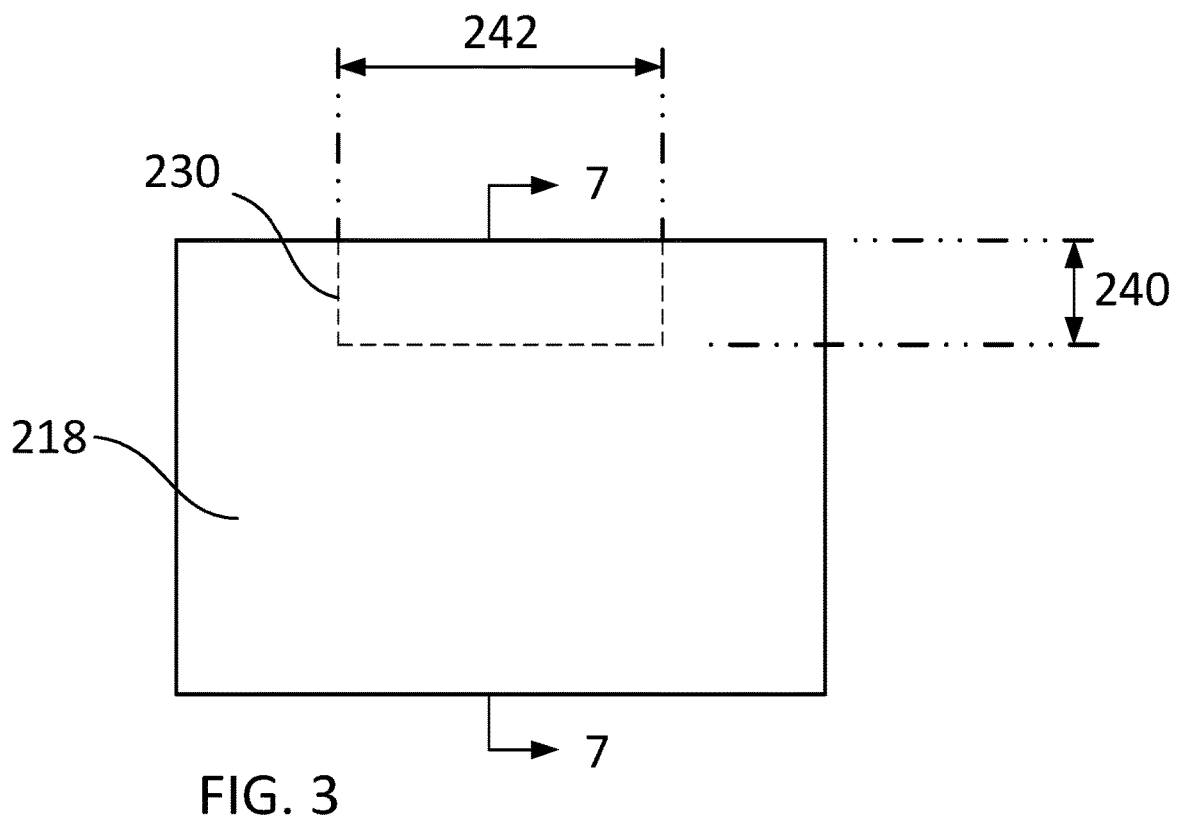
FIG. 3 is a rear view of a hidden cushion pocket, according to an embodiment of the present invention.
Figure 4:
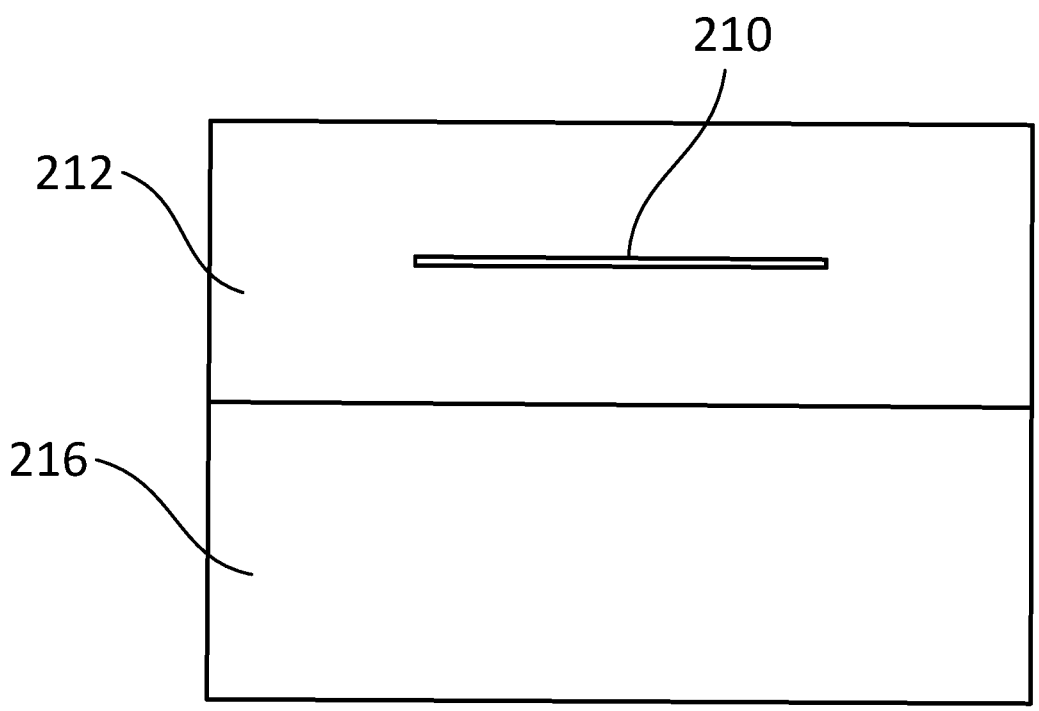
FIG. 4 is a top view of a hidden cushion pocket, according to an embodiment of the present invention.
Figure 5:
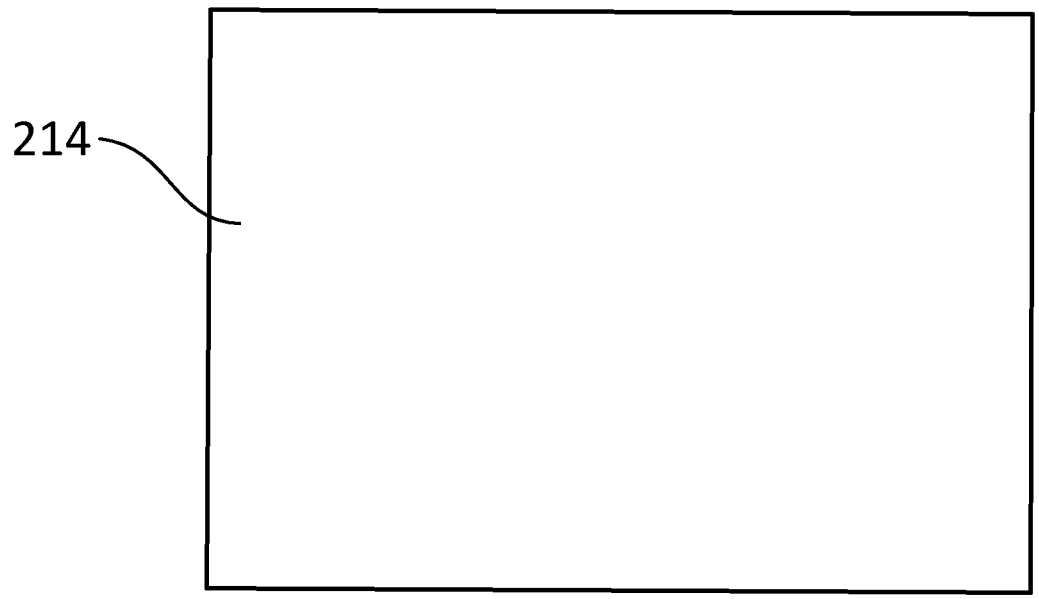
FIG. 5 is a bottom view of a hidden cushion pocket, according to an embodiment of the present invention.
Figure 6:
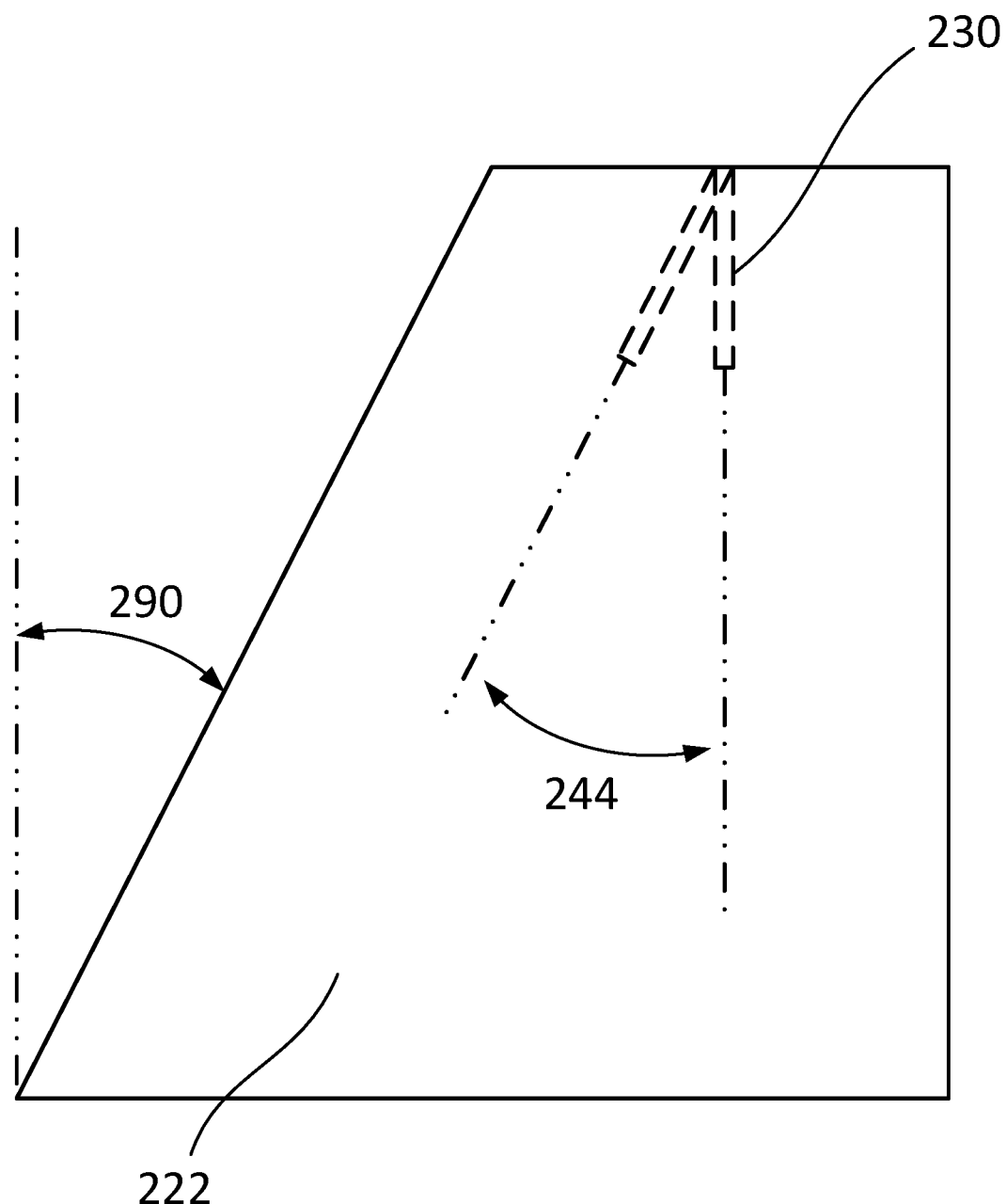
FIG. 6 is a right side view of a hidden cushion pocket, according to an embodiment of the present invention.
Figure 7:
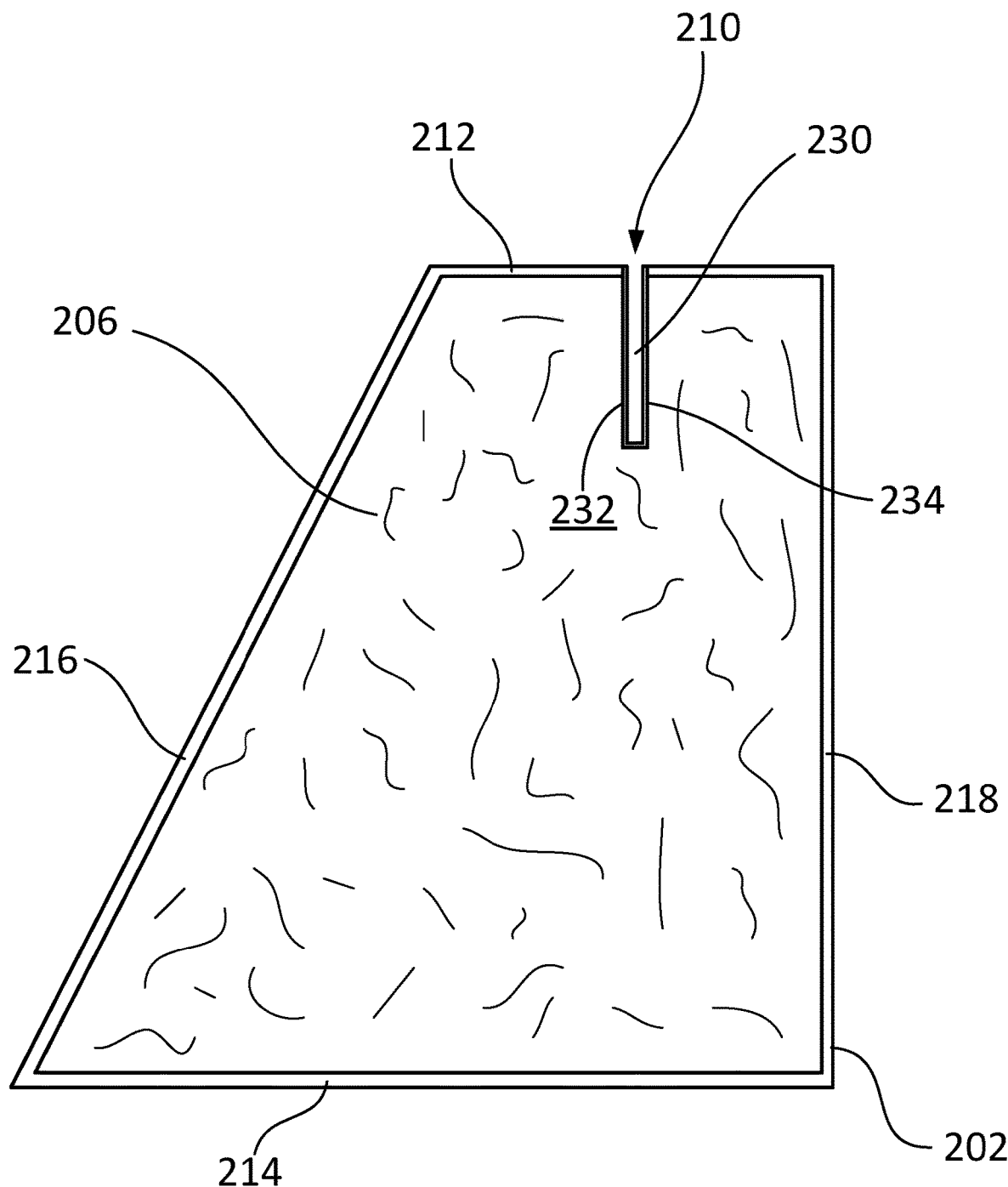
FIG. 7 is a cross-sectional view of a hidden cushion pocket across Line 7-7 as shown in FIG. 3, according to an embodiment of the present invention.
Figure 8:
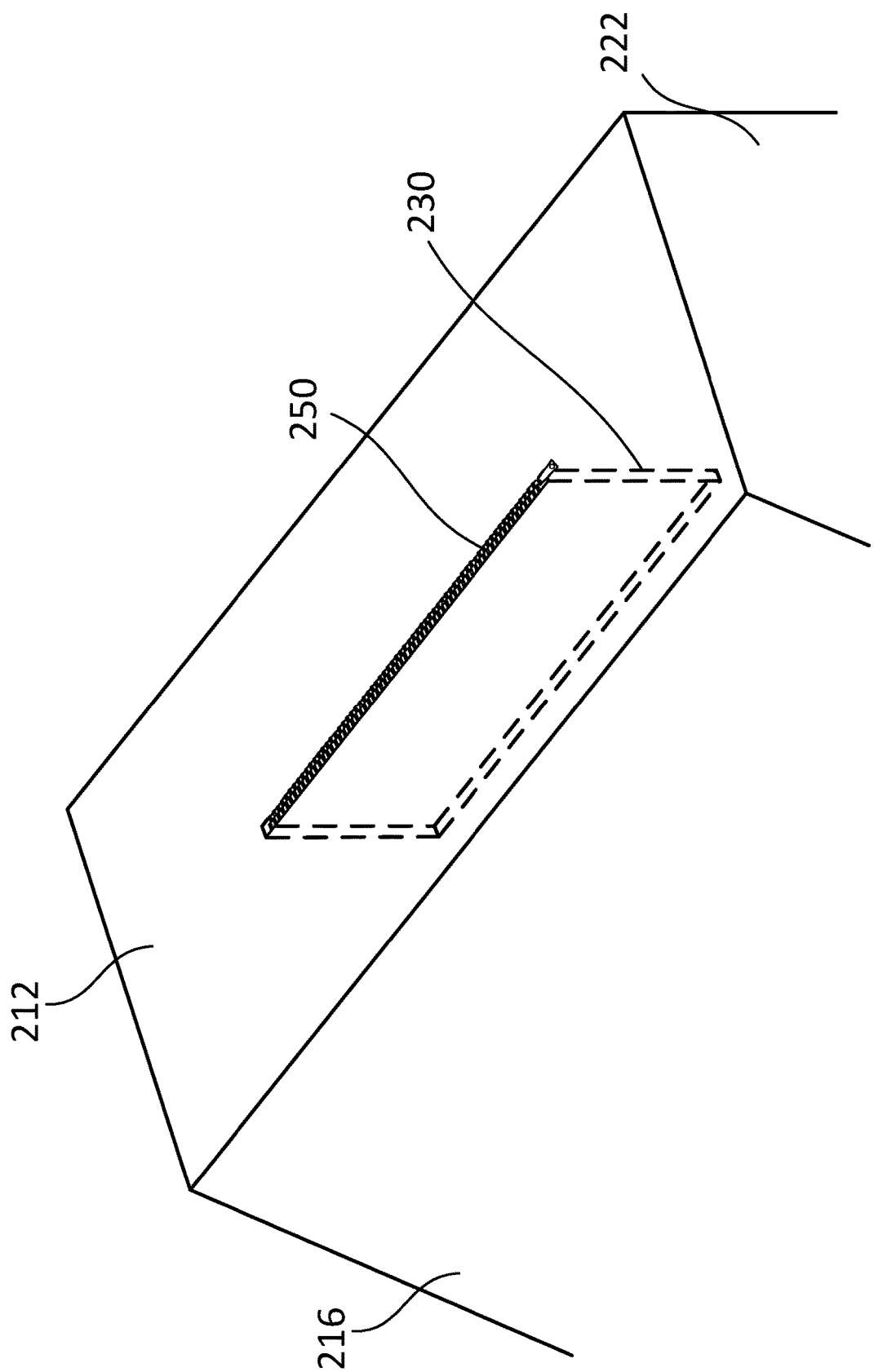
FIG. 8 is a detail view of a hidden cushion pocket, according to an embodiment of the present invention illustrating a zipper covering the pocket.
Figure 9:
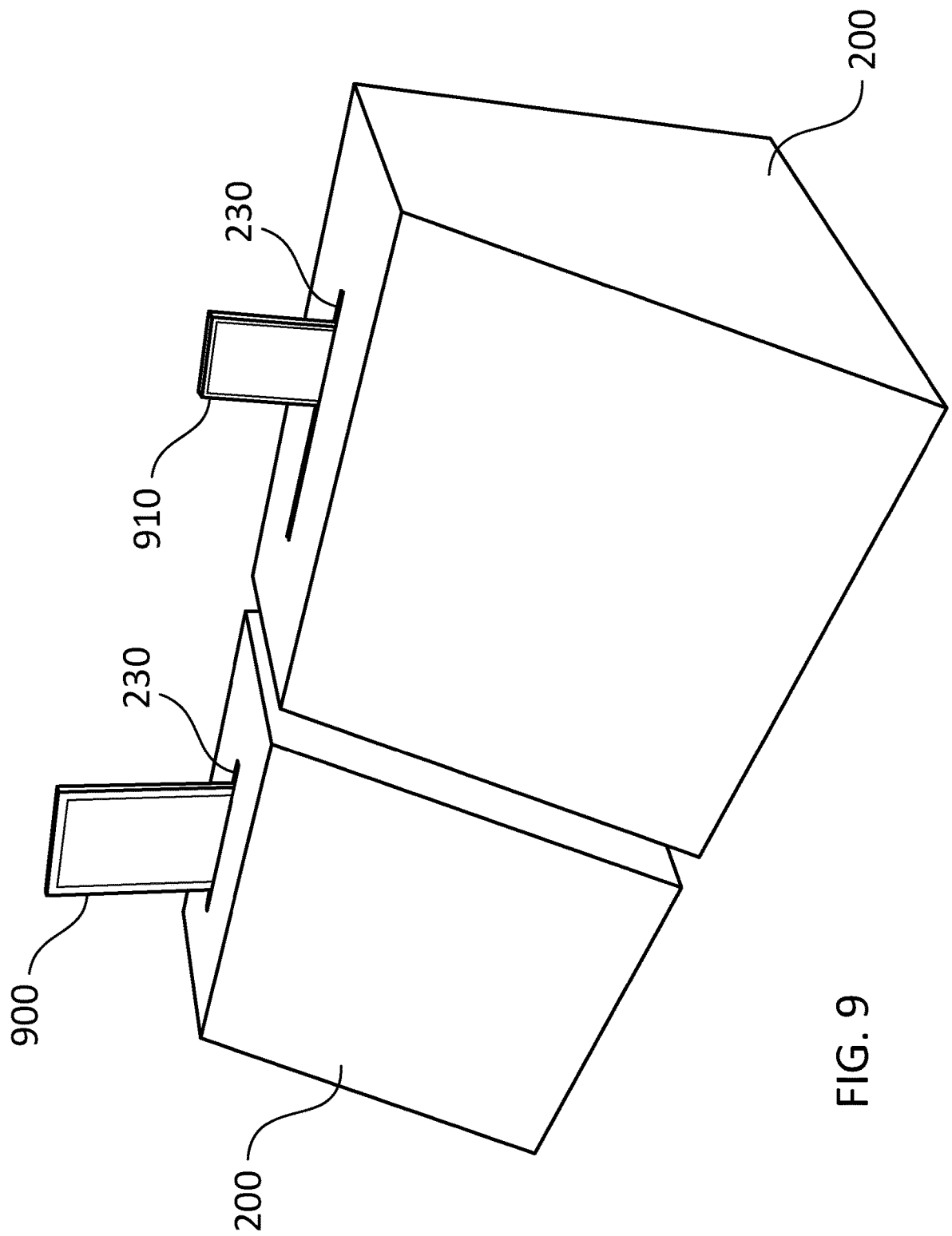
FIG. 9 is an in-use view of a hidden cushion pocket, according to an embodiment of the present invention illustrating two (2) cushions, a first cushion holding a tablet computer and a second cushion holding a smart phone.

100 hidden cushion pocket
200 cushion
202 covering
204 seam
206 fill material
210 pocket aperture
212 cushion top side
214 cushion bottom side
216 cushion front side
218 cushion rear side
220 cushion left side
222 cushion right side
230 pocket
232 pocket front wall
234 pocket rear wall
240 pocket depth
242 pocket width
244 pocket orientation angle
250 zipper
290 front slope angle
900 smartphone
910 tablet computer

DESCRIPTION OF THE INVENTION

The present invention is directed to a hidden cushion pocket (herein described as the "invention") 100. The invention 100 may comprise a cushion 200 and a pocket 230. The pocket 230 may be located within the cushion 200 and may therefore be hidden from view when not in use. The pocket 230 may be accessible at the top of the cushion 200 and may be adapted to retain a portable electronic device. As non-limiting examples, the portable electronic device may be a smartphone 900, a tablet computer 910, a game controller, or a TV remote control. The pocket 230 may be sized to permit the portable electronic device to stand upright such that the portable electronic device may remain visible while residing in the pocket 230.

The cushion 200 may comprise a covering 202 and a fill material 206. As used herein, the word "cushion" may refer, without limitation, to any object comprising a flexible outer covering and internal padding. As non-limiting examples, the cushion 200 may be an upholstered cushion, pillow, bolster, pad, beanbag, or headrest.

The covering 202 may be a flexible outer surface of the cushion 200. As non-limiting examples, the covering 202 may be made of cotton, linen, wool, natural or faux leather, acetate, hemp, silk, polyester, polypropylene, acrylic, rayon, or combinations thereof. The covering 202 may comprise, without limitation regarding quantity or positioning, one (1) or more seams 204. The one or more seams 204 may be edges where different panels of the covering 202 are coupled. In some embodiments, the covering 202 may be removable for laundering.

The fill material 206 may soften the cushion 200 and/or shape the cushion 200. The fill material 206 may comprise upholstery foam or loose fill. As non-limiting examples, the upholstery foam may be one (1) or more sections of shaped, semirigid foam.

The loose fill may be bulk cushioning material that may be poured or otherwise inserted into the cushion 200 to stuff the cushion 200. As non-limiting examples, the loose fill may comprise shredded foam, feathers, wool, polystyrene, horsehair, or shredded rubber.

The covering 202 may comprise a pocket aperture 210 that may provide access to the pocket 230 from outside of the cushion 200. The pocket aperture 210 may be an aperture through the covering 202 as a result of an opening cut in the covering 202 or as a result of a gap in a seam.

The cushion 200 may comprise at least a cushion front side 216 and a cushion rear side 218. In a preferred embodiment, the cushion 200 may also comprise a cushion top side 212, a cushion bottom side 214, a cushion left side 220, and a cushion right side 222. In some embodiments the edges of the cushion front side 216 may be coupled to the edges of the cushion rear side 218 giving the cushion 200 a pillow shape. In such embodiments, the pocket aperture 210 may be located on the top of the cushion 200 at the seam between the cushion front side 216 and the cushion rear side 218. In a preferred embodiment, the cushion 200 may distinctly comprise the cushion top side 212, the cushion bottom side 214, the cushion left side 220 and the cushion right side 222 and the pocket aperture 210 may be located at the center of the cushion top side 212.

In a preferred embodiment, the cushion rear side 218 may be vertically oriented and the cushion front side 216 may be inclined from vertical by a front slope angle 290 such that the overall shape of the cushion 200 is that of a right trapezoidal prism with the cushion top side 212 that is narrower than the cushion bottom side 214.

The pocket 230 may be a pouch that is located inside of the cushion 200. The pocket 230 may comprise at least a pocket front wall 232 and a pocket rear wall 234. In some embodiments, the pocket front wall 232 and the pocket rear wall 234 may be coupled to each other along three edges with the top edges left uncoupled. The top edges of the pocket front wall 232 and the pocket rear wall 234 may be coupled to the sides of the pocket aperture 210 such that the pocket 230 is formed within the cushion 200.

In a preferred embodiment, the pocket 230 may further comprise pocket side walls and a pocket bottom wall. The pocket side walls, and the pocket bottom wall may be coupled between the pocket front wall 232 and the pocket rear wall 234 to provide a larger volume within the pocket 230. The tops of the pocket front wall 232, the pocket rear wall 234, and the pocket side walls may be coupled to the cushion top side 212 at the pocket aperture 210.

A pocket depth 240 may be selected such that the portable electronic devices remain visible above the pocket 230. In a preferred embodiment, the pocket depth 240 may be between two and one-half inches (2½) and three and one-half inches (3½). A pocket width 242 may be selected such that larger devices such as the tablet computers 910 may fit into the pocket 230. In a preferred embodiment, the pocket width 242 may be between ten and one-half inches (10½) and nine and one-half inches (9½).

The orientation of the pocket 230 within the cushion 200 may be established, at least in part, by the placement of the fill material 206 within the cushion 200. As a non-limiting example, the pocket 230 may extend vertically downwards within the cushion 200 if the fill material 206 is a uniform thickness behind the entire height of the pocket 230 and if the fill material 206 is of uniform density both in front of and behind the pocket 230. In some embodiments, a pocket orientation angle 244 may be made non-vertical by using an alternative placement of the fill material 206. As a non-limiting example, the pocket orientation angle 244 may be altered such that the pocket 230 is oriented to be parallel to the cushion front side 216. This may advantageously change the viewing angle of the portable electronic device, thus making the portable electronic device easier to read. Other angles for the pocket orientation angle 244 are also possible.

In some embodiments, the covering 202 may comprise a zipper 250 at the location of the pocket aperture 210. The zipper 250 may be closed to cover the pocket 230 and may be opened to provide access to the pocket 230.

In use, the cushion 200 may be placed upon a sofa, love seat, floor, children's play area, or other location. A portable electronic device may be placed into the pocket 230 such that the portable electronic device is visible and accessible above the cushion 200 to prevent loss of the portable electronic device and/or to support the portable electronic device during use.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A hidden cushion pocket, consisting of:
   a pillow shape cushion having a covering, a fill material, a top, a cushion rear side, a cushion front side, a cushion bottom side, a cushion left side, and a cushion right side; and
   a pocket disposed within the pillow shape cushion, the pocket is accessible at the top of the pillow shape cushion and is adapted to retain a portable electronic device;
   wherein the covering is defined by a pocket aperture that provides access to the pocket from outside of the pillow shape cushion;
   wherein the pocket aperture is defined by an aperture through the covering formed by an opening cut in the covering or formed by a gap in a seam;
   wherein the aperture is formed where one or more edges of a plurality of different panels of the covering are coupled together;
   wherein the pillow shape cushion rear side is vertically oriented, and the pillow shape cushion front side is inclined from vertical by a front slope angle such that the overall shape of the pillow shape cushion is that of a right trapezoidal prism where the cushion top side is narrower than the cushion bottom side;
   wherein the pillow shape cushion is placed upon a sofa, a love seat, a floor, or a children's play area;
   wherein the covering includes a zipper at the location of the pocket aperture that is closed to cover the pocket and is opened to provide access to the pocket;
   wherein the pocket is a pouch that is located inside of the cushion; and
   wherein the covering is removable for laundering.

2. The hidden cushion pocket, according to claim 1, wherein the covering is a flexible material.

3. The hidden cushion pocket, according to claim 1, wherein the covering is a material selected from the group consisting of cotton, linen, wool, natural leather, faux leather, acetate, hemp, silk, polyester, polypropylene, acrylic, rayon, or any combinations thereof.

4. The hidden cushion pocket, according to claim 1, wherein the fill material is a plurality of upholstery foam.

5. The hidden cushion pocket, according to claim 1, wherein the fill material is a plurality of loose fill.

6. The hidden cushion pocket, according to claim 5, wherein the loose fill is selected from the group consisting of shredded foam, feathers, wool, polystyrene, horsehair, or shredded rubber.

7. The hidden cushion pocket, according to claim 1, wherein the pocket is sized to permit the portable electronic device to stand upright such that the portable electronic device remains visible while residing in the pocket.

8. The hidden cushion pocket, according to claim 1, wherein the fill material is selected from the group consisting of cotton, linen, wool, natural leather, faux leather, acetate, hemp, silk, polyester, polypropylene, acrylic, rayon, or any combinations thereof.

9. The hidden cushion pocket, according to claim 1, wherein the portable electronic device is selected from the group consisting of a smartphone, a tablet computer, a game controller, or a TV remote control.

* * * * *